(12) United States Patent
Meyers et al.

(10) Patent No.: US 9,658,385 B2
(45) Date of Patent: May 23, 2017

(54) LIGHTING SYSTEM WITH IMPROVED ILLUMINATION DISTRIBUTION

(71) Applicant: General Electric Company, Schenectady, NY (US)

(72) Inventors: Mark Marshall Meyers, Mechanicville, NY (US); Steven Robert Hayashi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 11 days.

(21) Appl. No.: 14/726,058

(22) Filed: May 29, 2015

(65) Prior Publication Data

US 2015/0260902 A1  Sep. 17, 2015

Related U.S. Application Data

(63) Continuation of application No. 13/969,361, filed on Aug. 16, 2013, now Pat. No. 9,046,225.

(51) Int. Cl.
| | |
|---|---|
| *F21V 7/04* | (2006.01) |
| *F21V 8/00* | (2006.01) |
| *F21S 8/04* | (2006.01) |
| *F21K 9/61* | (2016.01) |
| *F21Y 101/00* | (2016.01) |
| *F21Y 103/10* | (2016.01) |
| *F21Y 115/10* | (2016.01) |

(52) U.S. Cl.
CPC .............. *G02B 6/0045* (2013.01); *F21K 9/61* (2016.08); *F21S 8/04* (2013.01); *G02B 6/0011* (2013.01); *G02B 6/0061* (2013.01); *G02B 6/0073* (2013.01); *F21Y 2101/00* (2013.01); *F21Y 2103/10* (2016.08); *F21Y 2115/10* (2016.08)

(58) Field of Classification Search
CPC .. G02B 6/0045; G02B 6/0061; G02B 6/0011; G02B 6/0073; F21K 9/52; F21S 8/04; F21Y 2101/02; F21Y 2103/003
See application file for complete search history.

(56) References Cited

U.S. PATENT DOCUMENTS

| | | |
|---|---|---|
| 5,521,725 A | 5/1996 | Beeson et al. |
| 6,316,842 B1 | 11/2001 | Kuroda et al. |
| 6,483,272 B1 | 11/2002 | Terada et al. |

(Continued)

FOREIGN PATENT DOCUMENTS

| | | |
|---|---|---|
| EP | 1455431 A2 | 9/2004 |
| WO | 2012109193 A2 | 8/2012 |

OTHER PUBLICATIONS

Michael, "Microstructured Optical Components for Waveguide-based Luminaires", Reflexite, May 2001.
"Microprism Technology for Luminaires", Reflexite, 2010.

*Primary Examiner* — Donald Raleigh
(74) *Attorney, Agent, or Firm* — Nitin N. Joshi

(57) ABSTRACT

Optically patterned waveguides and systems employing optically patterned waveguides are provided. The optically patterned waveguide is configured for use in a lighting system and arranged perpendicular to an overhead structure, such as a ceiling. The optically patterned waveguide includes major surfaces that are patterned with a plurality of elongated facets formed into the major surfaces and extending in a direction parallel to the length of the waveguide. The optically patterned waveguide provides illumination patterns having increased uniformity.

26 Claims, 6 Drawing Sheets

(56) References Cited

U.S. PATENT DOCUMENTS

| | | | |
|---|---|---|---|
| 6,612,723 B2 | 9/2003 | Futhey et al. | |
| 6,874,913 B2 | 4/2005 | Munro et al. | |
| 7,722,224 B1 | 5/2010 | Coleman et al. | |
| 8,068,707 B1 | 11/2011 | Simon | |
| 2007/0189701 A1* | 8/2007 | Chakmakjian | G02B 6/0028 385/146 |
| 2009/0122229 A1* | 5/2009 | Kim | G02B 6/0038 349/65 |
| 2010/0157615 A1 | 6/2010 | Gruhlke | |
| 2010/0220497 A1* | 9/2010 | Ngai | G02B 6/002 362/610 |
| 2011/0310616 A1 | 12/2011 | Carruthers | |
| 2013/0039050 A1* | 2/2013 | Dau | G02B 6/0045 362/218 |
| 2014/0268875 A1* | 9/2014 | Durkee | G02B 6/0046 362/612 |

\* cited by examiner

LIGHTING SYSTEM WITH IMPROVED ILLUMINATION DISTRIBUTION

CROSS REFERENCE TO RELATED APPLICATIONS

This application is a continuation of U.S. application Ser. No. 13/969,361, entitled "Lighting System with Improved Illumination Distribution" filed Aug. 16, 2013, the specification of which is incorporated herein by reference in its entirety for all purposes.

BACKGROUND OF THE INVENTION

The subject matter disclosed herein relates generally to lighting systems, and more specifically, to lighting systems having improved illumination distribution.

Area lighting is typically found in homes, office spaces, warehouses, storage areas, museums, trade centers and commercial spaces, for example. One continually developing technology employed for area lighting applications is lighting systems utilizing light emitting diodes (LEDs). LED-based lighting systems are increasingly used to replace conventional fluorescent and incandescent lighting systems. LED-based lighting systems may provide a longer operating life, high luminous efficacy, and improved manufacturability at lower costs. However, conventional LED-based lighting systems may not be optimal for all area lighting applications.

For instance, conventional LED-based area lighting systems which are employed to illuminate a number of vertically positioned regions may not be capable of adequately and optimally illuminating the various vertically positioned regions in a consistent manner. For instance, for overhead lighting systems typically mounted on a ceiling and configured to illuminate a number of vertically oriented shelves on either side of an aisle of a retail store, it is desirable that each of the vertically oriented shelves is consistently illuminated in a uniform manner from one shelf to the next. Disadvantageously, conventional lighting systems may direct light beams to areas of little interest such as a ceiling or upper sections of building walls that are above the shelves containing objects of interest, such as products for display or sale. Further, many systems suffer from significant scattering and absorbent losses within the lighting fixture. Further, conventional lighting systems suffer a luminance drop for the vertically oriented surfaces from the highest vertically oriented surface to the lowest vertically oriented surface. The misdirection of the light produced by the lighting system and the loss of light within the structures result in inefficiency of the lighting system. Further, loss of luminance and non-uniformity in illumination of all areas of interest is generally undesirable.

BRIEF DESCRIPTION OF THE INVENTION

In one embodiment, a waveguide includes a top surface configured to receive light from a light source. The waveguide also includes at least one major surface configured to distribute light received from the light source to a surrounding area. The at least one major surface includes an optical pattern having elongated facets, wherein each of the elongated facets extends into the major surface and through the entire length of the waveguide.

In another embodiment, a waveguide includes a first major surface having a length and height. The waveguide also includes a second major surface arranged opposite the first major surface and having the same length and height. Each of the first major surface and the second major surface include a plurality of elongated facets formed therein, wherein each of the elongated facets is formed parallel to one another in a direction of the length.

In another embodiment, a system includes a light source. The system also includes an optically patterned waveguide arranged to receive light from the light source at a first surface and distribute the light through a second surface, perpendicular to the first surface, wherein the second surface comprises a height and a length. The second surface includes a plurality of repeating sections formed therethrough and arranged vertically throughout the height, wherein the repeating sections comprise a plurality of segments extending throughout the length.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Embodiments of the present invention provide lighting systems employing Light Emitting Diodes (LEDs) and an optically patterned waveguide that is oriented vertically from an overhead region and aligned to illuminate an area of interest by directing light to targeted areas. Embodiments of the invention include a series of LEDs optically coupled to a vertically-oriented optical waveguide having major surfaces that have been designed to optimize the illumination of the lighting system into a controlled pattern to maximize the utility of the illumination by shaping the output intensity distribution such that it covers desirable areas with higher brightness illumination in a more uniform pattern than previous lighting systems. The vertically-oriented waveguide is patterned to redirect light from the LED onto vertical and horizontally oriented surfaces below the lighting system in an optimized manner. The patterned surfaces of the waveguide control both the vertical and horizontal extent of the illumination area.

In accordance with embodiments of the present invention, the surfaces of the waveguide are optically patterned such that the pattern penetrates into the waveguide to mitigate total internal reflective properties of the waveguide over the face of the optic. The optic may extend over the horizontal width of the waveguide that occupies only a small fraction of its vertical height. The vertical shape of the vertical pattern may include any number of designs that may be optimized to provide uniform brightness and adequate lighting over areas of interest along vertically arranged regions, such as displays or shelves vertically oriented along walls or aisles.

Technical advantages of lighting systems employing embodiments of the present design include improved efficiency in extracting light from the LEDs in the lighting system and optimization of the direction of the light to the targeted areas. The improved efficiency of the lighting system reduces cost of electricity to achieve a desired level of illumination for a particular application. Further, embodiments of the present invention provide improved uniformity of illumination on targeted areas, such as vertically oriented surfaces, such as rows of shelves. The improved uniformity allows objects on lower shelves to be well lit to advantageously highlight objects on the lower shelves at a higher brightness than conventional lighting systems which may fade at lower target regions.

Figure 1:
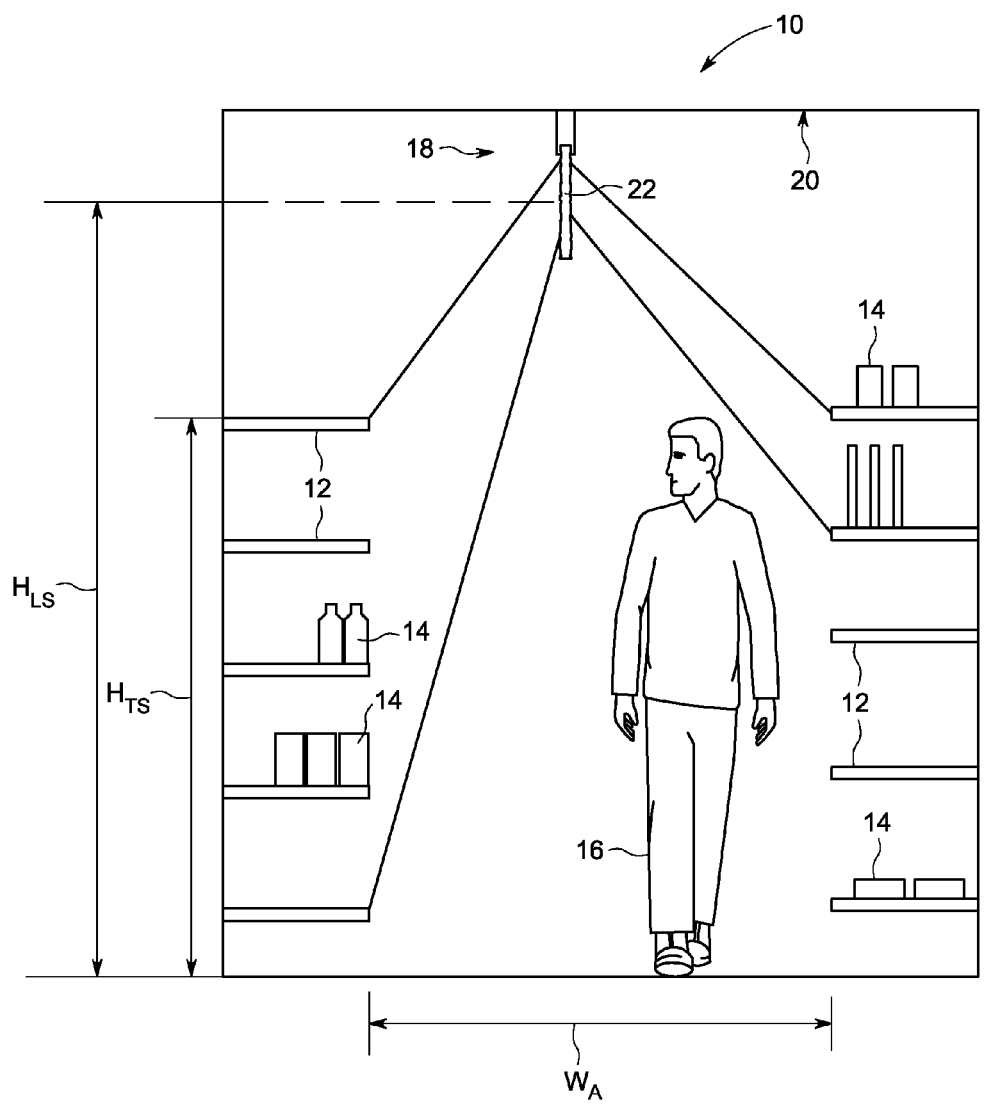
FIG. 1 is a perceptive view of a lighting system employed in accordance with one embodiment of the present invention.

Turning to the figures and referring initially to FIG. 1, the aisle 10 of a commercial space, such as a store, is illustrated. Each side of aisle 10 includes horizontal surfaces or shelves 12 arranged vertically with respect to one another for displaying products 14. The shelves 12 are vertically arranged such that a customer 16 is able to view the products 14 displayed on the shelves 12. The aisle 10 may have an associated aisle width $W_A$. The aisle width $W_A$ may be in the range of 2.0 m-4.0 m, for example. Further, the shelves 12 may be arranged along a vertical surface such as a wall, such that the top shelf is positions at height $H_{TS}$ above the floor. The height $H_{TS}$ may be in the range of 1.5 m-3.0 m, for example. As will be appreciated the aisle width $W_A$ and the top shelf height $H_{TS}$ may be greater or less than the ranges described.

In order to illuminate the products 14 on the shelves 12, a luminaire or lighting system 18 is provided. As illustrated, the lighting system 18 is mounted to the ceiling 20 above the aisle 10 at a lighting system height $H_{LS}$. The height $H_{LS}$ may be in the range of 3.0 m-9.0 m, for example, though a height $H_{LS}$ greater than or less than the range provided may also be employed. In accordance with embodiments of the present invention, and as described in greater detail below, the lighting system 18 is an LED lighting system which includes one or more "blades" or waveguides 22 which are configured to illuminate the products 14 on the vertically arranged shelves 12 in a more uniform manner than many conventional systems. As is illustrated, the lighting system 18 is vertically oriented above the shelves 12. The waveguide 22 is configured to guide light such that light is directed to each side of the aisle 10 from the vertical surfaces of the waveguide 22. Further, and as discussed in detail below, the vertical surfaces of the waveguide 22 have been optically patterned such that the surfaces of the waveguide 22 provide a more uniform light distribution to each of the shelves 12 below. The patterned surfaces of the waveguide 22 are optimized such that lower shelves 12 are illuminated with generally the same light intensity and distribution as the upper shelves 12.

Figure 2:
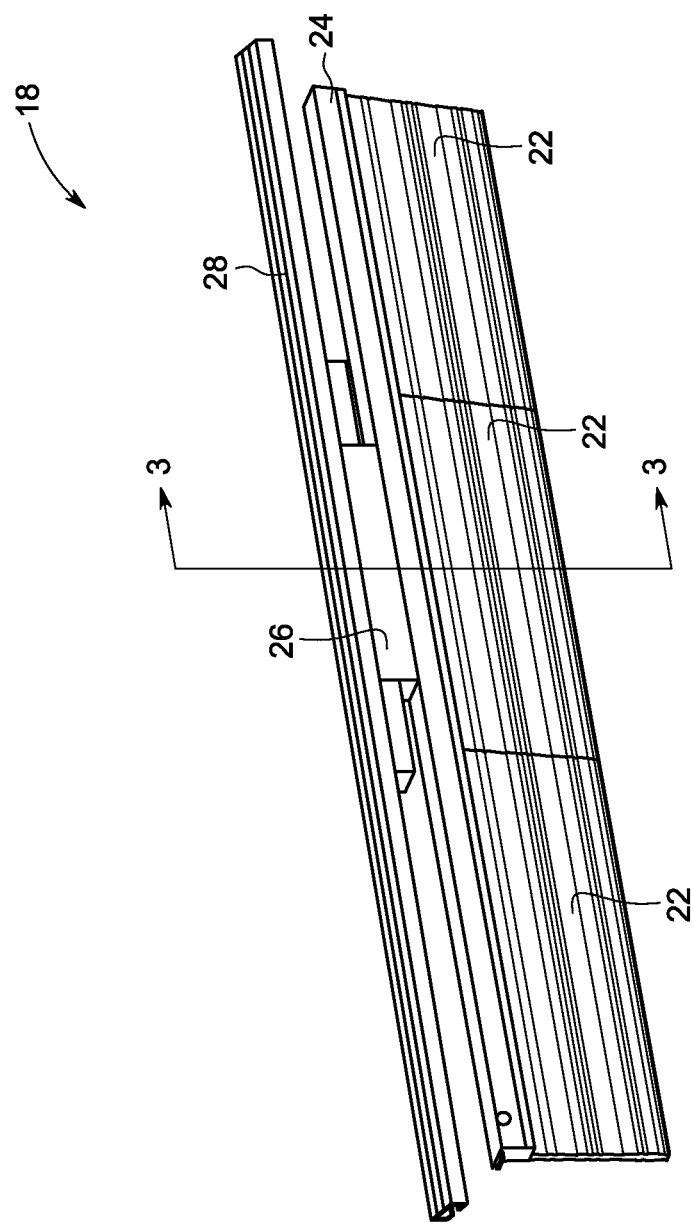
FIG. 2 is a more detailed view of the lighting system, in accordance with embodiments of the present invention.

Referring now to FIG. 2, a perspective view of the lighting system 18 configured in accordance with one embodiment of the present invention is illustrated. The lighting system 18 generally includes optically patterned waveguides 22 configured to distribute light in a controlled pattern to maximize the uniformity of the illumination by shaping the output intensity distribution such that it uniformly covers all areas of interest, such as the shelves 12 (FIG. 1), with brighter illumination in a more uniform pattern than previously attainable. In the illustrated embodiment, the lighting system 18 includes three optically patterned waveguides 22 which may be aligned in series. As will be appreciated, the number of waveguides 22 may vary from a single optically patterned waveguide 22 to any desirable number of waveguides 22 to extend to a desired system length. While a single "waveguide 22" is described at various times in the application for simplicity, embodiments of the present invention are not limited as such, and the lighting system 18 may include one or more waveguides 22.

The optically patterned waveguide 22 is coupled to a light source 24 configured to produce light for distribution through the optically patterned waveguide 22. In one embodiment, the light source 24 may include a number of LEDs arranged in a row along the entire length of the lighting system 18 such that each LED of the light source 24 produces light and directs it downward into the optically patterned waveguide 22. As will be appreciated, specific types of LEDs such as organic LEDs or alternative illumination devices may also be employed in the light source 24 to illuminate the optically patterned waveguide 22 in accordance with embodiments of the present invention. The light source 24 may include a number of other elements, such as clips, heatsinks, and reflectors, for example, as will be appreciated by those skilled in the art.

The lighting system 18 may further include an electrical box 26. The electrical box 26 may provide power to the light source 24. As will be appreciated, the electrical box may include driver components, electrical and mechanical adapters, mechanical retainer structures, terminal blocks, and other electrical and mechanical components configured to provide power to the light source 24. The electrical box 26 also includes components to mechanically secure the components within the electrical box 26 and to mechanically secure the light source 24 to a mounting mechanism 28. The mounting mechanism 28 may be any mechanical structure configured to couple the light source 24, electrical box 26 and waveguide 22 to an overhead region such as a ceiling or arm extending from a wall, such as a bracket, post, brace, shoulder, step or recess, for example. As will be appreciated, alternative configurations of the electrical box 26 in the mounting mechanism 28 may be employed in accordance with embodiments of the present invention. That is, any suitable components may be employed in the electrical box 26 or the mounting mechanism 28 such that the lighting system 18 may be arranged and secured to an overhead region such that adequate power is provided to the light source 24 for distribution in the optically patterned waveguide. Further, in some embodiments, the components of the light source 24, electrical box 26 and/or mounting mechanism 28 may be combined with one another such that they are contained within a single housing.

Figure 3:
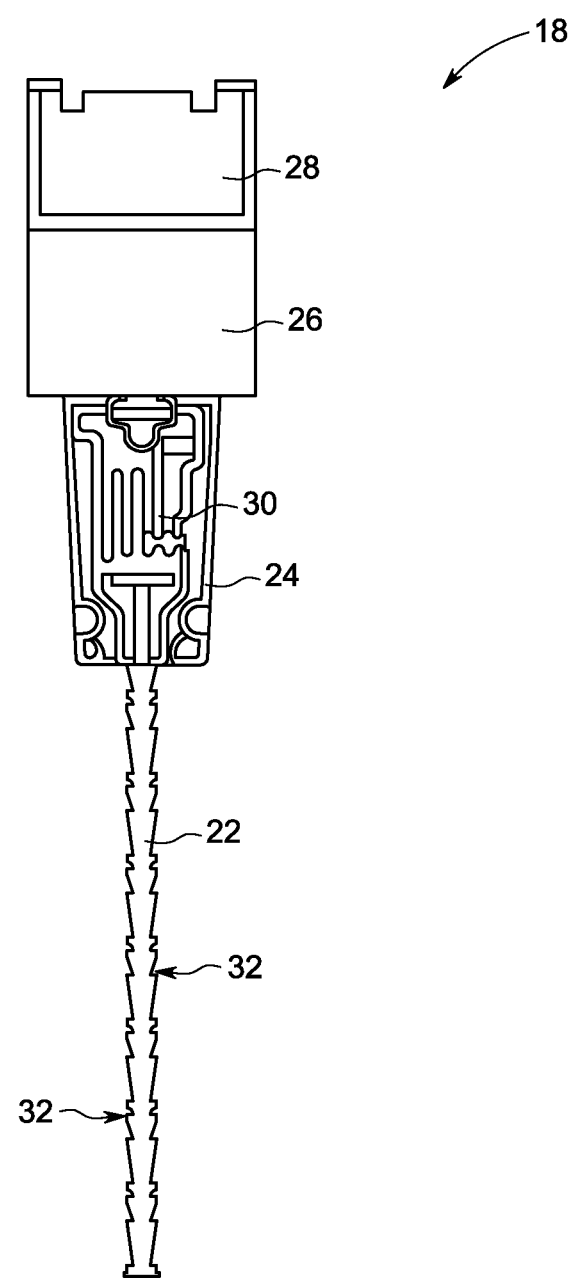
FIG. 3 illustrates a cross-sectional view of the lighting system illustrated in FIG. 2 and taken along the cut lines 3-3, in accordance with one embodiment of the present invention.

Referring now to FIG. 3, a cross-sectional view of the lighting system 18 taken along the cut-lines 3-3 of FIG. 2 is illustrated. As previously described, the lighting system 18 includes any suitable mounting mechanism 28 that may be used to couple the lighting system 18 to an overhead region such as a ceiling or arm extending to an overhead region. The mounting mechanism 28 may be coupled directly to the electrical box 26 configured to provide mechanical support and electrical signals to the light source 24. The light source 24 may include a plurality of LEDs 30 that may be arranged along the length of the lighting system 18. As illustrated in FIG. 3, the LED 30 is sized and configured to provide light to the optically patterned waveguide 22 which may be optically coupled to the light source 24. Specifically, the light source 24 provides illumination in a downward direction into the optically patterned waveguide 22. As described further below, each of the two sides or major surfaces 32 of the optically patterned waveguide 22 is optimally designed to reduce light scattering and increase overall uniformity of light distribution by directing increased light to target regions, such as the shelves 12 (FIG. 1). As used herein, each of the two "major surfaces" 32 refers to the sides of the waveguide 22 through which the vast majority of the light from the light source 24 is distributed into the surrounding environment (e.g., a room). The major surfaces 32 are the largest surfaces of the waveguide 22. As illustrated, each of the major surfaces 32 of the waveguide 22 is patterned, as described further below. As will be appreciated, the scale of the patterns illustrated on the major surfaces 32 has been exaggerated for purposes of discussion and illustration.

Figure 4:
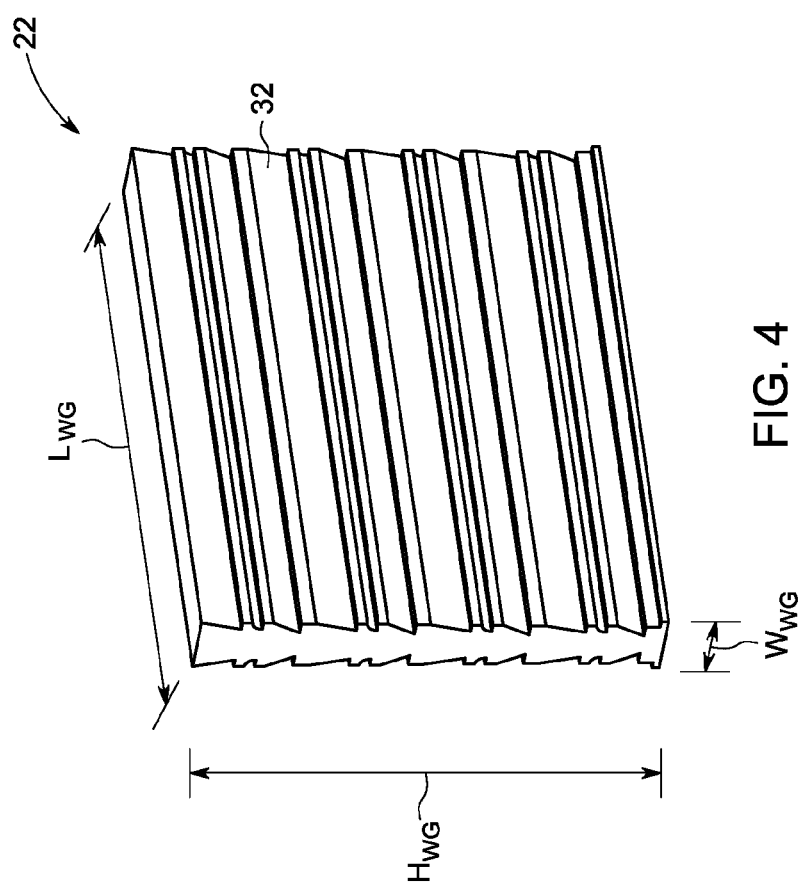
FIG. 4 is a perceptive view of a waveguide that may be employed in a lighting system in accordance with embodiments of the present invention.

Turning now to FIG. 4, a perspective view of the optically patterned waveguide 22 in accordance with embodiments of the present invention as illustrated. As previously described, the optically patterned waveguide 22 includes two major surfaces 32 that provide light to the surrounding environment. The optically patterned waveguide 22 includes a length $L_{WG}$, a height $H_{WG}$, and a width $W_{WG}$. As used herein, the length $L_{WG}$ refers to the horizontal dimension of the optically patterned waveguide 22 as it runs the length parallel to a surface above, such as a ceiling. It is the longest dimension of the optically patterned waveguide 22. The height $H_{WG}$ of the optically patterned waveguide 22 refers to the vertical dimension of the optically patterned waveguide 22 as it extends in the direction perpendicular to the surface above, such as the ceiling. The width $W_{WG}$ refers to the thickness of the optically patterned waveguide 22 and is the shortest dimension.

The length $L_{WG}$ of the waveguide 22, may be any desirable length, depending on the strength of the light source 24, the manufacturing capabilities for production of the waveguide 22 and the application in which the lighting system 18 is employed. In one embodiment, the length $L_{WG}$ of the optically patterned waveguide 22 may be in the range of 0.5-0.75 meters, such as 0.61 meters. As illustrated in FIG. 2, the lighting system 18 may employ three such waveguides 22, aligned end-to-end to produce a total length of 1.5-2.25 meters, for example.

The height $H_{WG}$ of the optically patterned waveguide 22 may also vary depending on the design of the lighting system 18. In one embodiment, the height $H_{WG}$ of the optically patterned waveguide 22 may be in the range of 0.10-0.20 meters, such as 0.128 meters. Comparatively, the width $W_{WG}$ of the optically patterned waveguide 22 is relatively small. For instance in one embodiment the width $W_{WG}$, of the optically patterned waveguide 22 maybe in the range of 0.003-0.005 meters, such as 0.004 meters.

Figure 5:
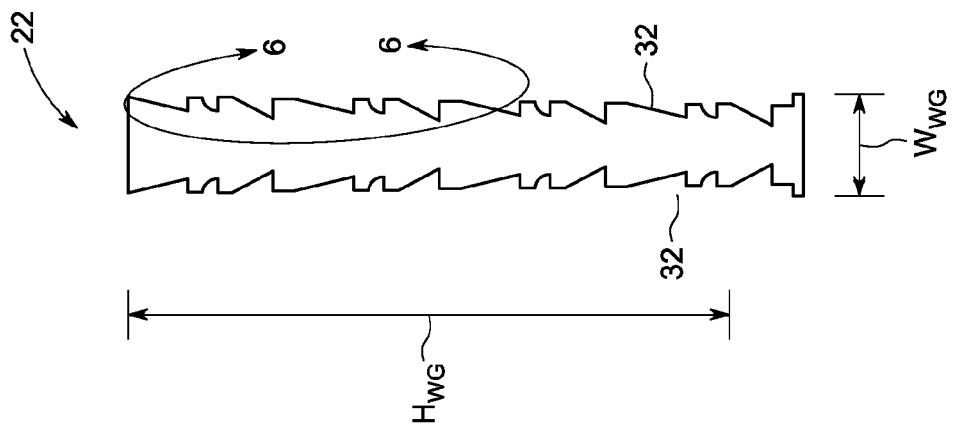
FIG. 5 is an end view of the waveguide of FIG. 4 that may be employed in a lighting system in accordance with embodiments of the present invention.

Turning now to FIG. 5, an end view of the optically patterned waveguide 22 is illustrated. As previously described, the waveguide 22 has a height $H_{WG}$ which depicts the vertical dimension of the optically patterned waveguide 22, perpendicular to the ceiling and floor. As previously described, each major surface 32 of the optically patterned waveguide 22 is fabricated such that each major surface 32 is configured to direct light in a downward manner such that a desired region is illuminated in a uniform manner throughout its entire verticality (e.g. shelves 12 arranged along a wall of an aisle 10, as depicted in FIG. 1). The optically patterned waveguide 22 may be a plastic material such as an acrylate or polycarbonate, for example. Alternatively, the optically patterned waveguide 22 may comprise a glass material such as a silica or fluoride, for example.

In accordance with embodiments described herein, the optically patterned waveguide 22 has been optimized by patterning the major surfaces 32 of the optically patterned waveguide 22 with a pattern of elongated groves that penetrate into the waveguide 22 such that the grooved pattern spoils the total internal reflection that would occur with a smooth or un-patterned surface. The grooves extend through the entire length $L_{WG}$ of the waveguide 22. By forming multiple elongated facets through the length $L_{WG}$ and down the height $H_{WG}$ of the waveguide $H_{WG}$, the brightness of uniformity distributed from the sides 32 of the optically patterned waveguide 22 can be optimized. As will illustrated and described in greater detail with regard to FIG. 6, the pattern can be optimized by adjusting the angle, width and radius of curvature of numerous elongated facets formed in the major surfaces 32.

As will be appreciated, the facets on the major surfaces 32 can reflect the light traveling within the waveguide 22 such that it exceeds the total internal reflection (TIR) condition on the opposite major surface 32 of the waveguide 22 after bouncing off the facet. That is to say that the light rays are deflected from their trajectory in a fashion that adds up with each bounce of a facet until it is incident at a high enough angle to transmit through the major surface 32 of the waveguide 22 on the opposite side of the facet that it was reflected from.

Modeling data and experimental data corresponding to physical prototypes produced in accordance with embodiments of the present invention were found to provide improved uniformity and brightness of light distribution toward the targeted areas compared with lighting systems using waveguides having either smooth surfaces, printed patterned surfaces, surfaces including random discrete geometric patterns, surfaces which are randomly roughened or surfaces that have not been enhanced in the manner described herein. In accordance of one embodiment, the optical patterns on the surface of the waveguide 22 may be formed in a mold used to fabricate the optically patterned waveguide 22 using any suitable molding techniques. Alternatively, the elongated grooved patterns may be formed through the major surfaces 32 of the optically patterned waveguide 22 using a machining or laser process capable of accurately forming the optical patterns in the waveguide 22, as described further below.

Figure 6:
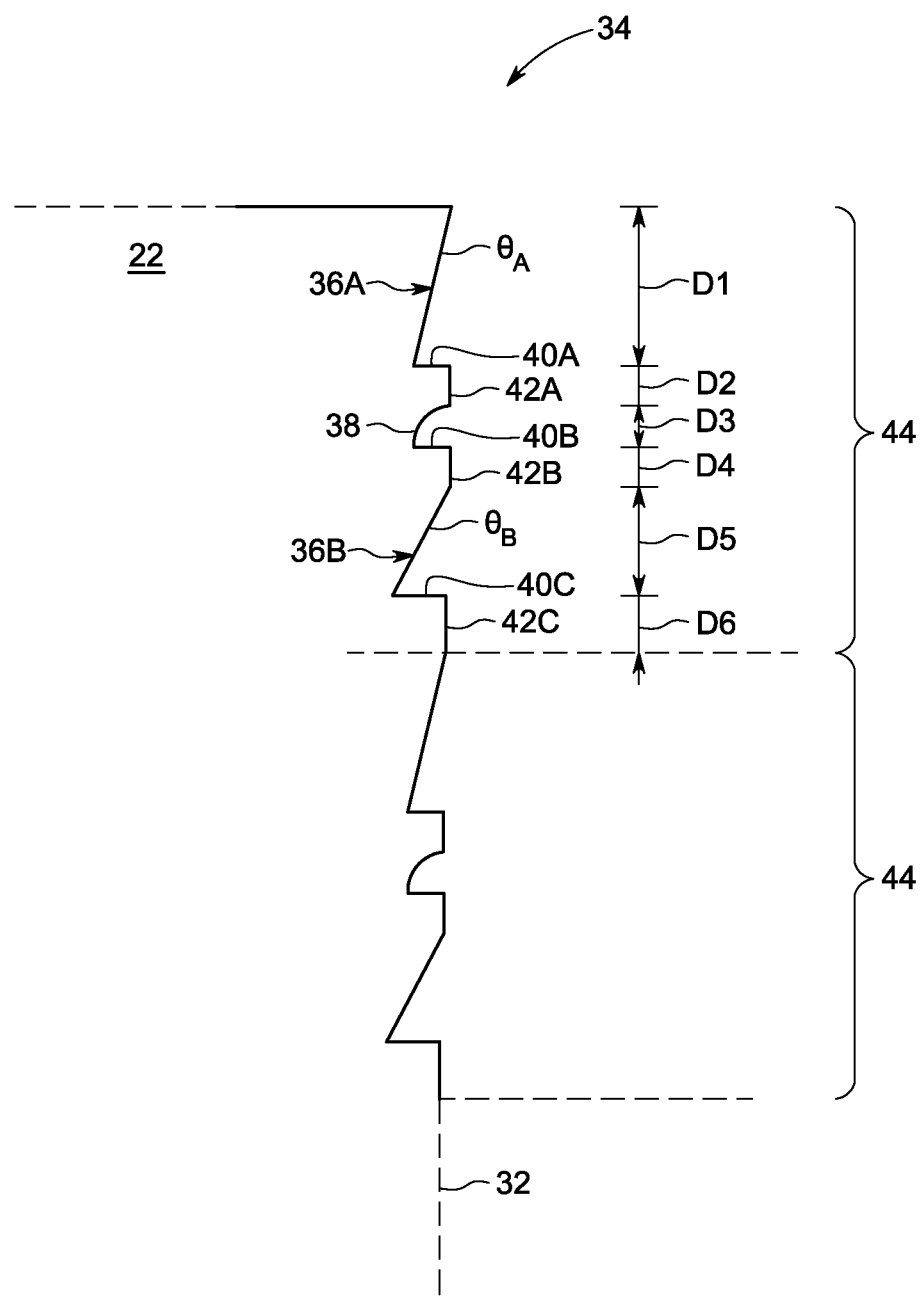
FIG. 6 illustrates various vertically oriented surface patterns that may be employed in a waveguide of a lighting system in accordance with embodiments of the present invention.

Referring now to FIG. 6, a detailed view of a portion of the major surface 32 of the optically patterned waveguide 22 taken along the cut lines 6-6 of FIG. 5 is illustrated. It should be noted that the exemplary surface pattern 34 illustrated in FIG. 6 is not drawn to scale. That is, angles, lengths, widths and radii of curvature may be exaggerated in order to more clearly illustrate the depicted features. As will be described in more detail below, the pattern 34 formed into the surface of the optically patterned waveguide 22 includes four types of segments: 1) ramp segments, generally depicted by reference numeral 36; 2) cylindrical segments, generally depicted by reference numeral 38; 3) planar horizontal segments, generally depicted by reference numeral 40; and 4) planar vertical segments, generally depicted by reference numeral 42. The exemplary pattern 34 is uniquely provided to optimize uniformity and intensity of light distribution through the optically patterned waveguide 22. However, as will be appreciated a number of other patterns may also be employed, as well. These alternative patterns may include more or fewer types of segments, more or fewer repeated patterns, many of which may include different angles, lengths and radii of curvature optimized to illuminate regions located at different angles and heights with respect to the waveguide 22. Optimization may be at least partially dependent on the height of the lighting system 18, the height of the areas to be illuminated (e.g., shelves 12) and the width of the distribution region (e.g., aisle 10). The pattern 34 has been optimized for a lighting system height $H_{LS}$ of approximately 3.5 meters, a top shelf height $H_{TS}$ of approximately 2.2 meters and an aisle width $W_A$ of approximately 2.4 meters, for example.

The illustrated pattern 34 includes repeating sections 44 throughout the height $H_{WG}$ of the waveguide 22 which includes a number of segments of various segment types. As used herein, the "repeating section" 44 refers to a length of patterns through a portion of the height $H_{WG}$ of the waveguide 22, before the entire pattern begins to repeat. In other words, each repeating section 44 includes an identical length of patterned facets. As previously discussed, each of the facets is an elongated, grooved segment that extends through the entire length of the waveguide $L_{WG}$.

The first segment type in the pattern 34 is a ramp segment 36, such as the ramp segments 36A and 36B. Each of the ramp segments 36A and 36B extends into the waveguide 22 at an angle $\theta_A$ and $\theta_B$, respectively, as measured from the flat, unpatterned segments (i.e., planar vertical segments 42) of the major surface 32 of the waveguide 22. In accordance with one embodiment, $\theta_A$ equals 2.45° and $\theta_B$ equals 4.1°. In addition, the vertical distances D1 and D5 are each 0.70 mm in accordance with the illustrated embodiment of the pattern 34.

Each repeating section 44 of the pattern 34 also includes a cylindrical segment 38. In the illustrated embodiment, the radius of curvature of the cylindrical segment 38 is 1.75 mm. Further, the distance D3 is 0.2 mm in accordance with the illustrated pattern 34.

Each repeating section 44 of the pattern 34 also includes planar horizontal segments 40, such as the planar horizontal segment 40A, 40B and 40C. As described herein, the planar horizontal segments 40 are arranged parallel to the horizontal surfaces of the ceiling and floor when the lighting system 18 is installed for overhead illumination, as described with regard to FIG. 1. In the illustrated embodiment, the planar horizontal segment 40A has a horizontal length of 0.03 mm. That is, the planar horizontal segment 40A extends 0.03 mm into the major surface 32 of the waveguide 22. Similarly, in the pattern 34, the planar horizontal segment 40B has a length of 0.03 mm. That is, the planar horizontal segment 40B extends 0.03 mm into the major surface 32 of the waveguide 22. The planar horizontal segment 40C has a horizontal length of 0.05 mm. That is, the planar horizontal segment 40C extends 0.05 mm into the major surface 32 of the waveguide 22.

Finally, the exemplary repeating section 44 includes three planar vertical segments 42A, 42B and 42C. The planar vertical segments 42 are defined as being perpendicular to or vertical with respect to the ceiling and floor. The planar vertical segments 42 represent planar portions of the major surface 32 of the waveguide 22 that remain planar and un-patterned. In the illustrated embodiment, each of the segments 42A, 42B and 42C are 0.20 mm. Thus, the distances D2, D4 and D6 are each 0.20 mm.

As will be appreciated, the repeating sections 44 repeat throughout the entire height of the waveguide $H_{WG}$. Further, while only a single major surface 32 is illustrated, in exemplary embodiments, the opposite major surface 32 will be similarly patterned with repeating sections 44 repeating throughout the height of the waveguide $H_{WG}$. While the pattern 34 has been demonstrated to provide optimal illumination and uniformity, other patterns are also contemplated within the spirit and scope of the disclosed embodiments.

Figure 7:
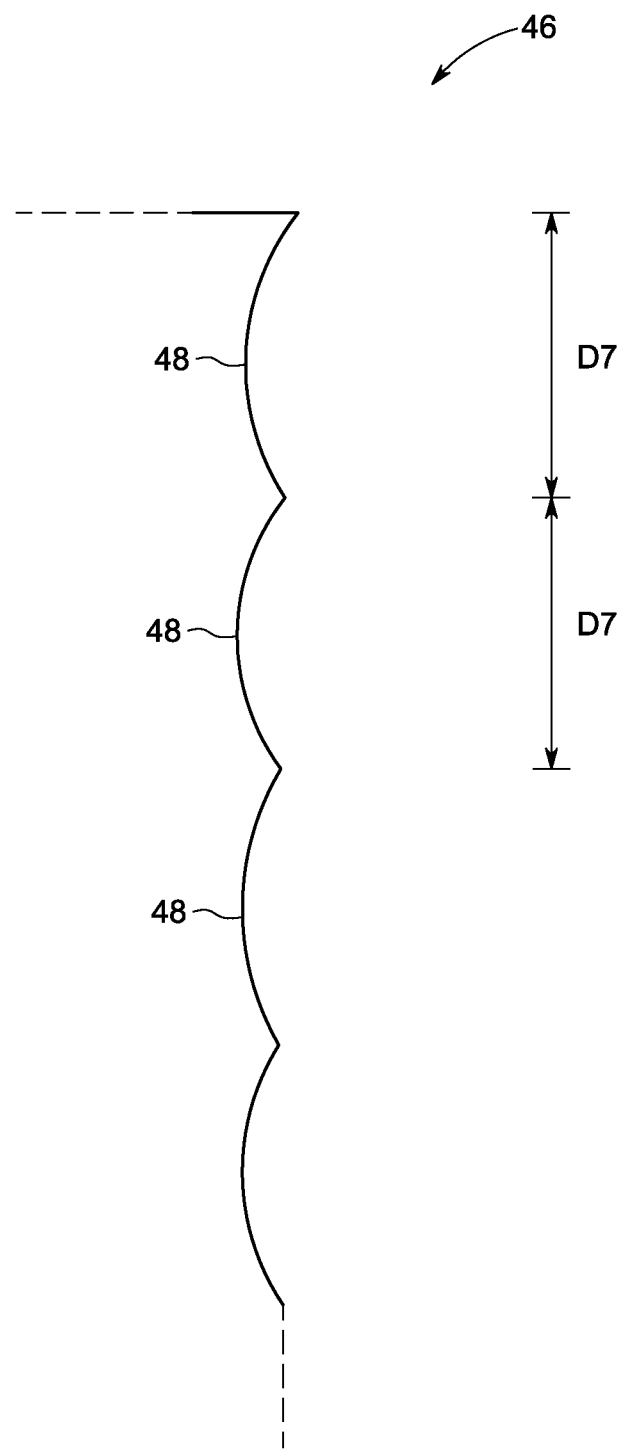
FIG. 7 illustrates a horizontally oriented surface pattern that may be employed in a waveguide of a lighting system in accordance with embodiments of the present invention.

Turning now to FIG. 7, an alternative embodiment of the present invention is described. As described and illustrated above, the elongated grooved pattern 34 extends through the length of the waveguide $L_{WG}$ and in repeating sections 44 through the height of the waveguide $H_{WG}$. In addition to the patterning described above, another embodiment of the invention includes a modulation in the depth of the groove along the horizontal direction over the length of the waveguide Lwg. FIG. 7 illustrates a partial top view of the secondary pattern 46. The secondary pattern includes repeating curved sections 48 that each extends a distance D7 along the length of the waveguide $L_{WG}$. In accordance with one embodiment, the distance D7 is in the range of approximately 1 mm to 50 mm. Further, the radius of curvature of each curved section has a radius of curvature in the range of approximately 5 mm to 50 mm. As will be appreciated, each of the curved sections 48 of the secondary pattern 46 extends through the entire height of the waveguide $H_{WG}$.

In another alternative embodiment, the depth of the elongated grooved pattern 34 or the depth of individual facets (e.g., the length of the planar horizontal segments 40, may be modulated in the horizontal direction over the length of the waveguide $L_{WG}$. As will be appreciated, the modulation of the depth in the horizontal direction may expand the illumination pattern to exceed the width of the waveguide $W_{WG}$. In this embodiment, the vertical modulation acts as a negative lens segment which diverges the light from the waveguide 22 to cover a wider area.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A waveguide comprising:
an optically patterned waveguide configured to be vertically oriented from an overhead region and aligned to illuminate an area of interest by directing light to targeted areas, wherein the optically patterned waveguide comprises a first major surface configured to distribute light received from a light source to the targeted areas, wherein the first major surface comprises a pattern of elongated facets extending into the first major surface and through the entire length of the waveguide, and wherein the pattern of elongated facets comprises more than two segments, each having a unique segment type with respect to one another.

2. The waveguide of claim 1, wherein the unique segment types are chosen from a group of segment types comprising ramp segments, cylindrical segments, planar horizontal segments and planar vertical segments.

3. The waveguide of claim 1, wherein each of the more than two segments comprises a vertical distance in a range of 0.10-1.0 mm.

4. The waveguide of claim 1, comprising a second major surface arranged opposite the first major surface.

5. The waveguide of claim 4, wherein the second major surface is a mirror image of the first major surface.

6. The waveguide of claim 1, further comprising a secondary pattern formed through the length of the waveguide and extending through the entire height of the waveguide.

7. The waveguide of claim 1, wherein each of the elongated facets extends into the major surface at a depth of less than 0.10 mm.

8. The waveguide of claim 1, wherein the length of the waveguide is in a range of 0.5-0.75 meters.

9. The waveguide of claim 1, wherein the height of the waveguide is in a range of 0.10-0.20 meters.

10. The waveguide of claim 1, wherein the width of the waveguide is in a range of 0.003-0.005 meters.

11. A waveguide comprising:
an optically patterned waveguide configured to be vertically oriented from an overhead region and aligned to illuminate an area of interest by directing light to targeted areas, wherein the optically patterned waveguide comprises a first major surface configured to distribute light received from a light source to the targeted areas, wherein the first major surface comprises a pattern of elongated facets extending into the first major surface and through the entire length of the waveguide, and wherein the pattern of elongated facets comprises:
a cylindrical segment;
a first ramp segment extending into the first major surface at a first angle; and
a second ramp segment extending into the first major surface at a second angle, different from the first angle.

12. The waveguide of claim 11, wherein the first angle is in a range of approximately 2.25°-2.7°.

13. The waveguide of claim 11, wherein the second angle is in a range of approximately 3.9°-4.3°.

14. The waveguide of claim 11, wherein a vertical distance corresponding to the first ramp segment is in a range of approximately 0.6 mm-0.8 mm.

15. The waveguide of claim 11, wherein a vertical distance corresponding to the second ramp segment is in a range of approximately 0.6 mm-0.8 mm.

16. The waveguide of claim 11, wherein the pattern of elongated facets further includes at least one planar vertical segment.

17. The waveguide of claim 16, wherein a vertical distance of the at least one planar vertical segment is in a range of approximately 0.10 mm-0.30 mm.

18. The waveguide of claim 11, wherein the cylindrical segment has a radius of curvature in the range of approximately 1.65 mm-1.85 mm.

19. The waveguide of claim 11, wherein a vertical distance of the cylindrical segment is in a range of approximately 0.10 mm-0.30 mm.

20. The waveguide of claim 11, further comprising a secondary pattern formed through the length and extending through the entire height of the waveguide, wherein the secondary pattern comprises curved segments.

21. The waveguide of claim 20, wherein each of the curved segments extends a distance along the length of approximately 600 mm.

22. A system comprising:
a light source; and
an optically patterned waveguide arranged to receive light from the light source at a top surface and distribute the light through a first major surface and a second major surface, wherein each of the first major surface and the second major surface are generally perpendicular to the top surface, wherein each of the first major surface and the second major surface comprises a plurality of elongated facets extending into the first major surface and through the entire length of the waveguide, and wherein the pattern of elongated facets comprises more than two segments, each having a unique segment type with respect to one another.

23. The system of claim 22, wherein the plurality of elongated facets extends the entire length of the waveguide.

24. The system of claim 22, wherein the light source comprises one or more light emitting diodes.

25. The system of claim 22, further comprising a mounting mechanism configured to couple the light source to an overhead structure.

26. The system of claim 22, wherein the optically patterned waveguide is arranged perpendicular to a ceiling after installation of the system for usage.

* * * * *